United States Patent

[11] 3,599,996

[72] Inventor Donald G. Holt
500 29th Ave., Oakland, Calif. 94601
[21] Appl. No. 836,668
[22] Filed June 25, 1969
[45] Patented Aug. 17, 1971

[54] TOOLHOLDER FOR A MACHINE TOOL
19 Claims, 5 Drawing Figs.
[52] U.S. Cl.................................................. 279/1 B,
279/37, 279/78, 279/89
[51] Int. Cl...................................................... B23b 31/10
[50] Field of Search........................................... 279/1 B, 1
F, 1 ME, 37, 78, 82, 89, 1 E, 1 SG, 90, 91, 103,
107, 29

[56] References Cited
UNITED STATES PATENTS
2,279,310  4/1942  Grey............................. 279/78
2,769,643  11/1956  Denzler........................ 279/37 X
2,931,660  4/1960  Barwinkel..................... 279/48
2,959,943  11/1960  Allen............................ 279/82 X Primary Examiner—Andrew R. Juhasz
Assistant Examiner—James F. Coan
Attorney—Gardner & Zimmerman ABSTRACT: A toolholder for machine tools such as boring mills and the like to enable quick and ready interchange of tool implements therefor while the machine tool is in operation. The holder includes a rotatable spindle adapted to be continuously driven by such machine tool, and it is provided with an axially extending passage open at one end for receipt of a tool implement therein. Retainer structure selectively movable between tool-confining and tool-release positions is controlled by an operator element rotatably mounted upon the spindle and slidably displaceable relative thereto to control the position of the retainer structure. A driver mounted within the spindle passage is forced to rotate with the spindle but is selectively movable relative thereto under the control of the operator between an operative position in which it drivingly engages the tool implement and an inoperative position released therefrom. The operator element thereby controls both the retainer structure and driver, and it can be moved between its open and closed positions to permit removal and replacement of tool implements with the machine tool in operation.

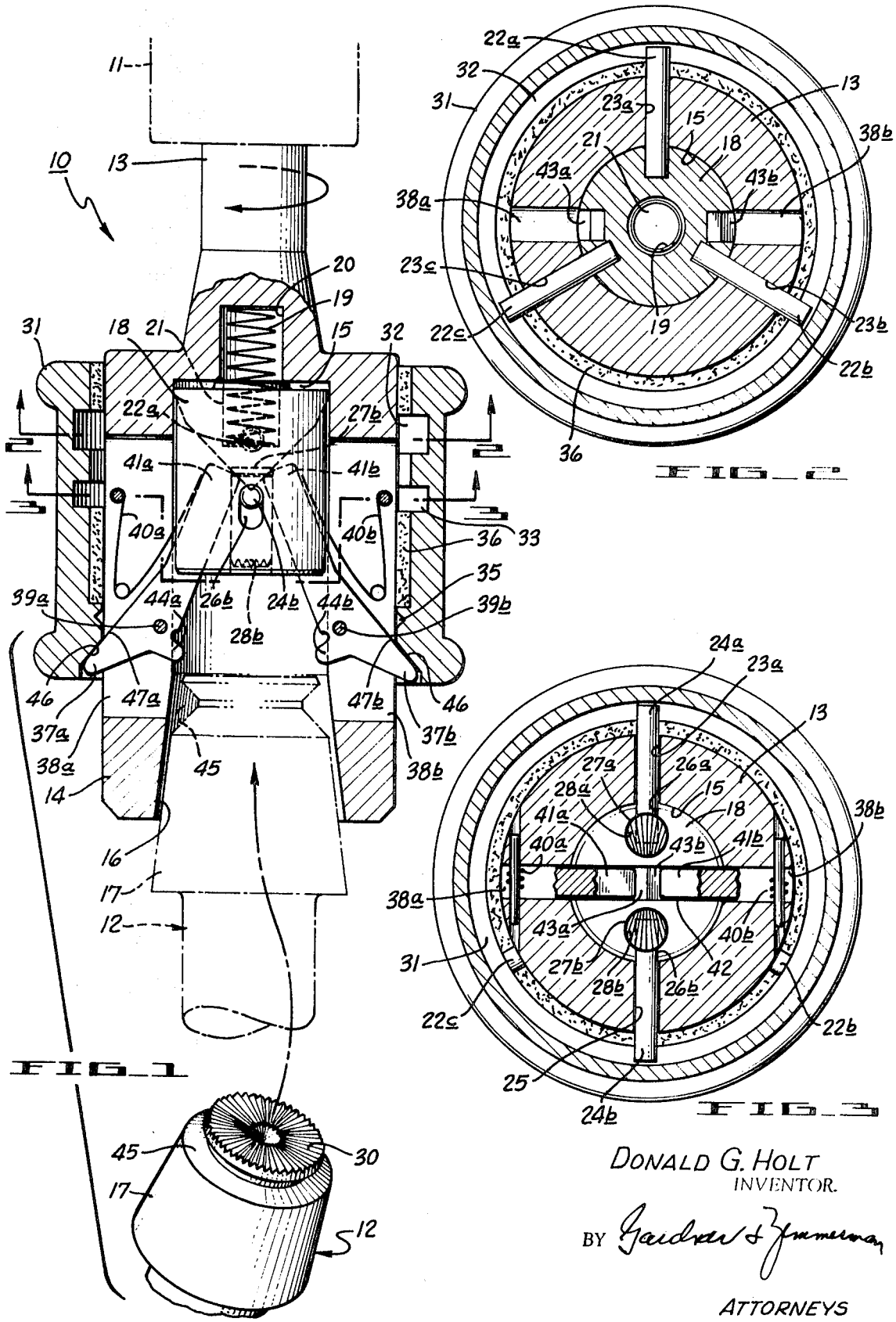

PATENTED AUG 17 1971
3,599,996
SHEET 2 OF 2
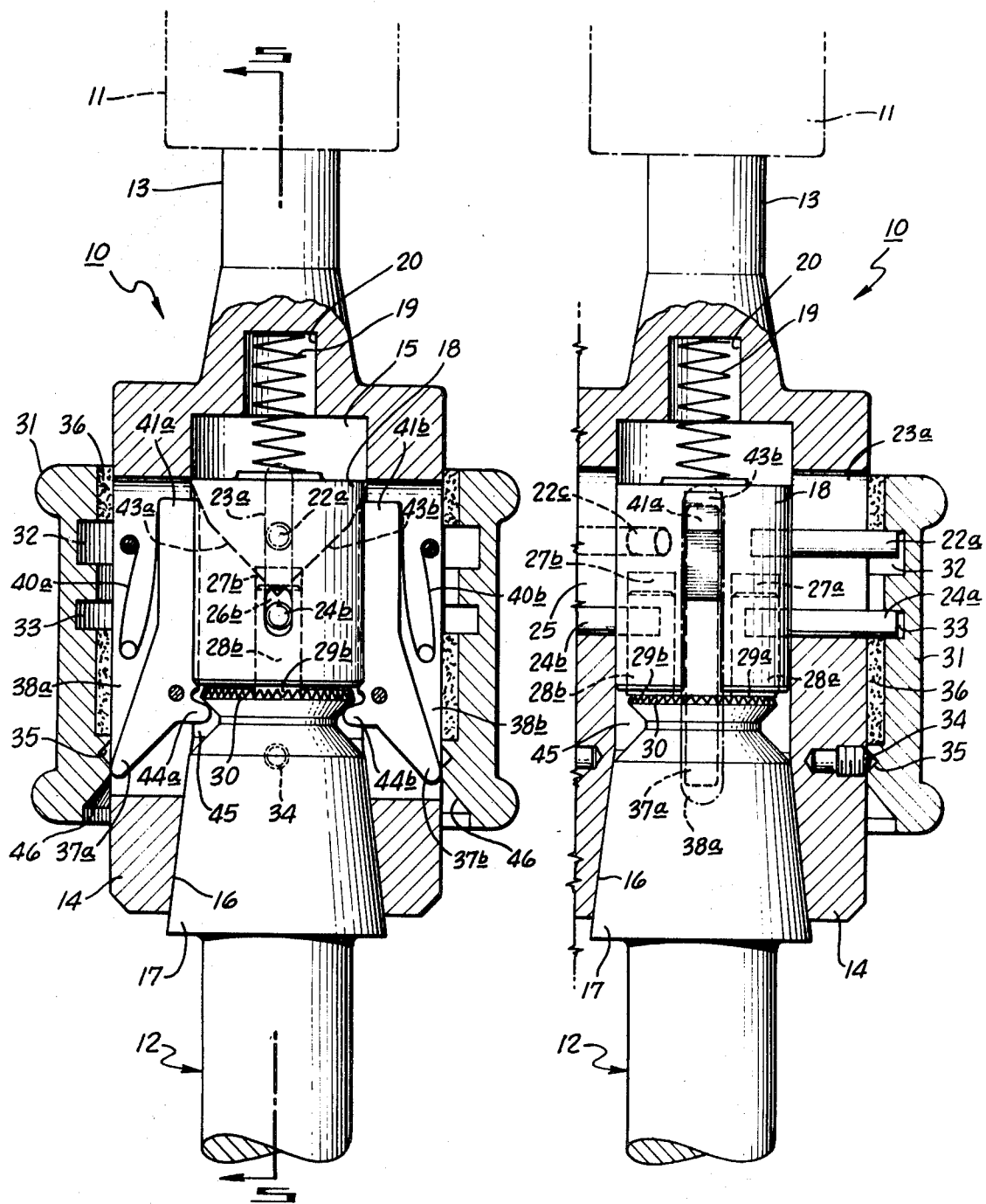
FIG_4
FIG_5
DONALD G. HOLT
INVENTOR.
BY Gardner & Zimmerman
ATTORNEYS 3,599,996

1

TOOLHOLDER FOR A MACHINE TOOL

This invention relates generally to machine tools such as boring mills and the like and, more particularly, to the collet, chuck or tool-implement holder by means of which tool implements are releasably connected with such machine tools so as to be rotatably driven thereby.

In such machine tools, the work-engaging tool implement thereof is necessarily changed from time to time, and to facilitate such change, these machine tools are universally equipped with special tool-implement holders that are often referred to as chucks or collets. Such holders provide a means for releasably connecting the tool implements with the machine tool in an enforced orientation in which the tool is aligned with the axis of rotation of the spindle through which the toolholder is driven. An object of the present invention is to provide an improved tool-implement holder affording quick, easy and ready interchange of tool implements while the machine tool continues to rotatably drive the spindle connected thereto and with which the toolholder is associated.

In accomplishing this general object, the toolholder provides a spindle that is adapted to be rotatably driven by an associated machine tool, and which spindle provides within its interior an axially extending passage open at its lower end for receipt of a tool implement therein. The open end of such passage is tapered, as is the head end of the tool implement insertable thereinto, and the mating surfaces of the passage and tool implement enforce upon the latter a condition of alignment thereof with the axis of rotation of the spindle. A driver is mounted within the spindle passage and is constrained against rotation relative to the spindle but is axially movable with respect thereto between an operative position in which it drivingly engages the tool implement and an inoperative position in which it is disengaged therefrom. Retainer structure carried by the spindle is movable between retain and release positions in which it respectively confines the tool implement within the holder and affords insertion thereinto and removal of the tool implement therefrom. An operator element supported upon the spindle for rotation relative thereto is axially displaceable therealong between closed and open positions and is connected with both the driver and retainer structure so as to control the same such that when the operator is in its open position, the driver and retainer structure are respectively in their inoperative and release positions; and when the operator is in its closed position, the driver and retainer structure are respectively in their operative and retain positions.

As the specification proceeds, additional objects and advantages of the invention will become apparent especially as the particular features and details are considered in connection with the embodiment of the invention illustrated in the accompanying drawings, in which:

FIG. 1 is a longitudinal sectional view taken along the axis of the tool-implement holder with the upper end portion of a tool implement shown in full lines in spaced relation therewith;

FIG. 2 is a transverse sectional view taken along the line 2–2 of FIG. 1;

FIG. 3 is a transverse sectional view taken along the line 3–3 of FIG. 1;

FIG. 4 is an axial sectional view similar to that of FIG. 1 but illustrating a tool implement in position within the holder; and FIG. 5 is an axial sectional view taken along the line 5–5 of FIG. 4.

The tool-implement holder shown in the drawings is designated in its entirety with the numeral 10, and it is intended for use with and essentially forms a part of a machine tool generally denoted in FIGS. 1, 4 and 5 with the numeral 11. Apart from the holder 10, such machine tool may be completely conventional and, for example, may be a boring mill or other mechanism using tool implements that are rotatably driven and necessarily changed one for another from time to time. A portion of the tool implement is also shown in FIGS. 1, 4 and 5 and is generally denoted with the numeral 12. As in the case of the machine tool 11, the work-engaging end portion of the tool implement 12 may be completely conventional, and for this reason is not shown.

The holder 10 is in the nature of a chuck or collet and comprises a spindle 13 adapted to be rotatably driven by the machine tool 11, as indicated by the arrow in FIG. 1. The spindle 13 is enlarged throughout its lower tool-receiving end, as indicated generally by the numeral 14, and such enlarged lower end is provided with an axially extending passage 15 which is open at its lower end 16 for receipt of the head or upper end portion 17 of the tool implement 12 therein. As respects such open end 16, it is tapered and has a somewhat frustoconical configuration as does the upper end portion or head 17 of the tool implement 12. As illustrated in FIGS. 4 and 5, such tapers are complementary so that the surface of the head 17 is snugly engaged by the circumjacent surface of the opening 16 when the tool is fully inserted into and is confined within the holder 10. Such snug engagement aligns the tool 12 with the axis of rotation of the spindle 13.

Mounted within the passage 15 is a tool-implement driver 18 which is axially displaceable therealong between the upper inoperative position shown in FIG. 1 and the lower operative position illustrated in FIGS. 4 and 5. In the form shown, as illustrated most clearly in FIG. 2, the passage 15 and driver 18 are cylindrical and the driver is slidably related to the passage for such relative axial displacements. The driver 18 is biased downwardly toward the open end 16 of the passage 15 by a helical compression spring 19 that at one end seats within a reduced-diameter extension 20 of the passage 15 and at its other end seats within a recess or short passage 21 within the driver 18. The driver 18 is constrained against rotation relative to the spindle 13 by connector structure which also limits the extent of permissible downward displacement of the driver relative to the passage 15 under the biasing force of the spring 19.

Such connector structure includes a plurality of pins 22 that are angularly spaced and extend radially outwardly from the driver 18 through the enlarged lower end portion 14 of the spindle 13, as is most evident in FIG. 2. In the particular structure being considered, there are three such pins 22 (the suffixes a, b and c being used to distinguish therebetween) spaced apart by 120°, and at their inner ends they seat within recesses or bores provided therefor in the driver 18. Referring to FIG. 5, it will be seen that the spindle 13 is provided with a plurality of angularly spaced slots 23 respectively passing the pins 22 therethrough and which slots are axially extending so as to accommodate the aforementioned axial displacements of the driver 18 within the passage 15. As in the case of the pins 22, the suffixes a, b and c are used with the number 23 to respectively associate the appropriate pins and slots. The dimensions of the pins 22 and passages 23 are such that substantially no looseness is defined therebetween since the driver 18 is rotatably driven by the spindle 13 through the pins 22. However, the fit of the pins within the slots 23 enables the driver 18 to be axially displaced relative to the passage 15 with substantially no frictional inhibition to such displacements.

A pair of additional pins 24a and 24b angularly spaced from each other by 180° extend radially outwardly from the driver 18 through slots provided therefor in the spindle 13. In the case of the pin 24a, it is in alignment with the pin 22a and projects outwardly through the aforementioned slot 23a, as shown in FIG. 5. The pin 24b extends outwardly through a slot 25 in the spindle 13, and the slot 25 is intermediate the pins 22b and 22c (and slots 23b and 23c) as is clear from inspection of FIG. 3. At their inner ends, the pins 24 respectively extend through slots 26a and 26b in the driver 18 and into recesses or bores 27a and 27b that are spaced apart by 180° and are axially oriented with respect to the driver.

The bores 27 are open at their lower ends and slidably receive therein a pair of high-friction components 28a and 28b which are provided with radial openings respectively seating the pins 24a and 24b therein. The components 28 are axially displaceable relative to the driver 18 within the limits defined by the driver slots 26, as is most apparent by comparing FIGS. 1 and 4. In this respect, the components 28 are movable between an upper inoperative position shown in FIG. 1 in which the lower end of each component is above the bottom surface of the driver 18, and a lower operative position shown in FIGS. 4 and 5 in which the lower end of each component projects beyond the bottom surface of the driver 18. The downwardly facing surface of each component 28 is roughened or equipped with teeth 29 (as shown in FIGS. 4 and 5) that are adapted to meshingly engage the tooth-equipped upwardly facing surface 30 of the tool 12. Evidently, the meshing engagement of the teeth 29 and 30 causes the driver 18 to rotatably drive the tool 12 upon complete insertion of the driver into the holder 10, as will be described in somewhat more detail subsequently.

An operator 31 in the form of a sleeve or collar is coaxially circumjacent the enlarged lower end portion 14 of the spindle 13 and is rotatable relative thereto and axially movable therealong between open and closed positions respectively shown in FIGS. 1 and 4 and respectively corresponding to the inoperative and operative positions of the driver 18. The operator 31 has a pair of axially spaced annular channels 32 and 33 respectively adapted to have the pins 22 and 24 project thereinto, as shown in FIG. 2 and 3. The channels 32 and 33 are sufficiently wide and high so that the pins are angularly displaceable therethrough whenever the spindle 13 and driver 18 rotate relative to the operator. It will be observed that the channel 32 is somewhat larger in height or in the axial direction than the channel 33, wherefore the top and bottom surfaces of the channel 33 are in substantially continuous engagement with the pins 24, as shown in FIG. 5, but the greater axial dimension of the channel 32 enables the operator 31 to be moved axially along the spindle 13 through a short distance before the top or bottom surfaces of such channel engage the pins 22.

More particularly, it is intended that the high-friction components 28 be released from driving engagement with the tooth-equipped surface 30 of the tool 12 before the tool is released from the holder for withdrawal therefrom and, in the opposite sense, that the tool 12 be confined within the holder before the components 28 drivingly engage the tool. Considering the configuration shown in FIG. 5, in which the tool is confined within the holder with the components 28 drivingly engaging the tool, when it is desired to remove the tool the operator 31 is gripped to prevent rotation thereof and the operator is then displaced upwardly along the axis of the spindle 13. It will be apparent that any such upward movement of the operator 31 will cause the pins 24 to displace the components 28 upwardly to withdraw the teeth 29 thereof from the mating tooth 30 of the tool 12, whereupon the driving engagement of the tool with the driver 18 will be interrupted. During such withdrawal of the components 28 from the tool 12, the operator 31 does not engage the pins 22 so that the driver 18 is not displaced upwardly thereby. However, following such initial upward displacement of the operator 31, the bottom surface of the channel 32 will engage the pins 22 thereby displacing the entire driver 18 upwardly against the biasing force of the spring 19.

When the operator 31 is displaced downwardly to confine the tool 12 within the holder, any downward axial displacement of the operator will cause the friction components 28 to move downwardly therewith; and although the driver 18 is not positively displaced downwardly by the operator because the pins 22 may not be in engagement with the upper surface of the channel 32, the driver is nevertheless displaced downwardly because of the resultant force imparted thereto by the spring 19. Therefore, the driver 18 is urged into its most downward position by the spring 19 before the operator 31 and pins 24 cause the components 28 to move downwardly relative to the driver 18 to bring the tooth-equipped surfaces 29 and 30 into engagement. The operator 31 is constrained within the lower closed position thereof by a spring-biased detent 34 provided by the spindle 13 and which detent is in the form of a ball that seats within an annular channel 35 provided by the operator 31 along its inner surface. Interposed between the facing surfaces of the spindle 13 and operator 31 is a suitable bearing 36 formed of Teflon bronze or the like.

The holder 10 further includes retainer structure supported by the spindle for selective movement between release and retain positions, respectively shown in FIGS. 1 and 4, enabling the tool implements 12 to be inserted into and removed from the passage 15 through the open end 16 thereof, and for confining any tool implement 12 within such passage. The retainer structure includes a pair of angularly spaced latches 37a and 37b that are respectively located within slots 38a and 38b and are supported for pivotal movement between outer release and inner retain positions, respectively shown in FIGS. 1 and 4, on posts 39a and 39b, respectively. Leaf springs 40a and 40b respectively associated with the latches 37a and 37b are supported within the slots 38 (as shown) and bear against the upper end portions 41a and 41b of the latches so as to resiliently bias the same into the release positions shown in FIG. 1.

The upper end portions 41 project into the driver 18 which is provided centrally therethrough with a slot or channel 42, as is shown most clearly in FIG. 3. The slot 42 at its upper end terminates in a pair of inwardly and downwardly converging cam surfaces 43a and 43b that slidably engage the upper ends 41a and 41b of the latches and cooperate therewith in effecting displacement of the latches from the release position shown in FIG. 1 into the retain position illustrated in FIG. 4. The latches 37 generally adjacent the post 39 are provided with inwardly projecting dogs or lugs 44a and 44b, respectively, that in the retain position of the structure project into an outwardly opening, circumferential channel 45 provided by the tool 12, as shown in FIG. 4.

The operator 31 engages the retainer structure comprising the latches 37a and 37b, and the operator and latches are provided with cooperative cam surfaces that cooperate in displacement of the latches into the retain position shown in FIG. 4 when the operator is displaced downwardly along the spindle 13. More particularly, the operator 31 has an inwardly and upwardly inclined annular cam surface 46 adjacent the lower end thereof that slidably engages the upwardly and inwardly inclined surfaces 47a and 47b provided by the latches 37a and 37b, as shown in FIGS. 1 and 4. Evidently, whenever the operator 31 is displaced upwardly from the closed position shown in FIG. 4 to the open position illustrated in FIG. 1, the corresponding upward displacements of the cam surface 46 of the operator and cam surfaces 43 of the driver 18 permit the springs 40 to displace the latches 37 into the release position thereof shown in FIG. 1, whereupon the tool 12 is free to be withdrawn from the passage 15 of the holder 10. Such upward movement of the operator causes the driver 18 and particularly the components 28 thereof to be disengaged from the tool 12 prior to release thereof by the retainer structure.

Accordingly, the tool can be grasped and held in a workman's hand to effect its removal from the holder while the spindle 13 continues to rotate. Upon replacement of a tool 12 within the holder 10 by inserting the upper end 17 of such tool into the open lower end 16 of the passage 15, the operator 31 is displaced downwardly, whereupon the cam surfaces 43 of the driver 18 and cam surface 46 of the operator 31 positively displace the latches 37 into their retain position shown in FIG. 4 in which the dogs 44 enter the channel 45 and thereby confine the tool in the position shown in FIGS. 4 and 5.

Accordingly, tool implements 12 can be quickly and easily changed without shutting down the machine tool 11 and while the spindle 13 continues to be rotatably driven thereby. In this respect, the operator 31 is readily gripped and constrained against rotation since it is freely rotatable relative to the spindle 13 and can be displaced axially therealong as the spindle rotates. Since the driving engagement defined between the driver 18 (and high-friction components thereof) and tool 12 is interrupted before the tool is released by the retainer spring comprising the latches 47 and is established only after the retainer structure has confined the tool within the holder, the tool 12 may be held by a workman and constrained against rotation during insertion into and removal from the holder 10 as it continues to be rotatably driven by the spindle 13.

The holder 10 can be assembled in any conventional manner, and in this respect the various posts used to support the latches 37 and springs 40 may be pressed through bores provided therefor in the spindle, as shown in FIG. 3. The pins 22 and 24 are inserted through the passages respectively provided therefor in the spindle 13 and into the recesses in the driver 18 and components 28 thereof after the driver and its components are located within the passage 15. The operator 31 may be a segmented component secured in circumjacent relation about the spindle 13 after the pins 22 and 24 are in position, or the operator may be provided with openings into the channels 32 and 33 so that the pins 22 and 24 can be positioned after the operator is in place in the case of its being an integral element. In either case, such techniques are conventional and well known, and for the sake of simplicity the operator 31 is shown as an integral component with any such openings into the channels 32 and 33 being omitted.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What I claim is:

1. A tool-implement holder for a machine tool or the like, comprising a spindle provided with an axially extending passage open at one end for receipt therein of a tool implement and adapted to be rotatably driven by such machine, a tool-implement driver mounted within said passage and being axially displaceable with respect thereto between an operative position of engagement with such tool implement to rotate the same and an inoperative position disengaged therefrom, connector structure constraining said driver against rotation relative to said spindle without significantly inhibiting such relative axial displacements therebetween, retainer structure supported by said spindle for selective movement between retain and release positions respectively confining such tool implement within said passage and affording insertion thereinto and removal of such tool implement therefrom, and an operator element operatively engaged with and controlling the positions of said driver and said retainer structure and being rotatably supported by said spindle and axially movable with respect thereto between closed and open positions respectively corresponding to the operative and inoperative positions of said driver and to retain and release positions of said retainer structure, said operator element upon insertion of a tool implement being movable to first move said retainer structure into retain position prior to moving said driver into operative position and upon removal of a tool implement first moving said driver into inoperative position prior to moving said retainer structure into release position.

2. The holder of claim 1 in which said operator and retainer structure have cooperative cam surfaces engageable with each other for moving said retainer structure into the retain position thereof upon displacement of said operator into its closed position, and further comprising spring means biasing said retainer structure toward the release position thereof.

3. The holder of claim 1 in which said operator is coaxially circumjacent said spindle and is provided along its inner surface with an annular channel, and in which said connector structure includes a plurality of radially extending pins projecting into said channel, said spindle being provided with a plurality of axially extending slots respectively passing said pins therethrough to accommodate axial displacements thereof with said operator and driver.

4. The holder of claim 1 in which said operator engages said retainer structure to effect such control over the position thereof.

5. The holder of claim 4 in which said operator and retainer structure have cooperative cam surfaces engageable with each other for moving said retainer structure into the retain position thereof upon displacement of said operator into its closed position, further comprising spring means biasing said retainer structure toward the release position thereof, in which said operator is coaxially circumjacent said spindle and is provided along its inner surface with an annular channel, and in which said connector structure includes a plurality of radially extending pins projecting into said channel, said spindle being provided with a plurality of axially extending slots respectively passing said pins therethrough to accommodate axial displacements thereof with said operator and driver.

6. The holder of claim 1 in which said driver is equipped with a high-friction component axially displaceable with respect thereto under the control of said operator so as to engage such tool implement and impart driving torque thereto in the operative position of said driver.

7. The holder of claim 6 in which said driver is provided with an axially extending recess, in which said high-friction component is a plunger reciprocable within said recess, and in which said operator is connected with said high-friction component so as to effect the aforesaid control thereof.

8. The holder of claim 7 in which the connection of said operator with said high-friction component effects disengagement thereof with such tool implement prior to displacement of said driver toward the inoperative position thereof and effects engagement of said component with such tool implement subsequent to displacement of said driver into its operative position.

9. The holder of claim 8 in which said operator is coaxially circumjacent said spindle and is provided along its inner surface with an annular channel, and further comprising a pin connected with said component and extending radially outwardly therefrom into said channel, said driver being provided with an axially extending slot affording limited axial displacement of said component and pin relative thereto, said spindle having an axially extending slot passing said pin therethrough and affording movement thereof with said operator and driver between the operative and inoperative positions of the latter.

10. The holder of claim 9 and further comprising spring structure connected with said spindle and driver to bias the latter toward the operative position thereof.

11. The holder of claim 10 in which said operator is provided with a second circumferential channel in the inner surface thereof, and in which said connector structure comprises a plurality of angularly spaced radially extending pins connected with said driver and projecting into said second channel, said spindle being provided with a plurality of additional axially extending slots respectively passing said pins therethrough to accommodate movement of said operator and driver between the operative and inoperative positions of the latter.

12. The holder of claim 1 and further comprising a tool implement in combination therewith, said tool implement having at the end thereof insertable into said passage an annular configuration and being provided thereat with an outwardly opening circumferential channel adjacent said retainer structure when said tool implement is fully inserted into said passage, said retainer structure being provided with angularly spaced latches that project into said channel to confine said tool implement as aforesaid when said retainer structure is in the retain position thereof, and said driver and tool implement being provided with cooperative components interengageable when said driver is in the operative position thereof.

13. The holder of claim 12 in which said driver is equipped with a high-friction component axially displaceable with respect thereto under the control of said operator so as to engage said tool implement and impart driving torque thereto in the operative position of said driver, said high-friction component comprising one of the aforesaid cooperative components provided by said driver and tool implement.

14. The holder of claim 13 in which the connection of said operator with said high-friction component effects disengagement thereof with such tool implement prior to displacement of said driver toward the inoperative position thereof and effects engagement of said component with such tool implement subsequent to displacement of said driver into its operative position.

15. The holder of claim 14 in which said operator is connected with said driver to effect such control over the position thereof, in which said operator is coaxially circumjacent said spindle and is provided along its inner surface with an annular channel, and in which said connector structure includes a plurality of radially extending pins projecting into said channel, said spindle being provided with a plurality of axially extending slots respectively passing said pins therethrough to accommodate axial displacements thereof with said operator and driver.

16. The holder of claim 15 in which said operator engages said retainer structure to effect such control over the position thereof, in which said operator and retainer structure have cooperative cam surfaces engageable with each other for moving said retainer structure into the retain position thereof upon displacement of said operator into its closed position, and further comprising spring means biasing said retainer structure toward the release position thereof.

17. The holder of claim 16 in which said driver is provided with an axially extending recess, in which said high-friction component is a plunger reciprocable within said recess, in which said operator is connected with said high-friction component so as to effect the aforesaid control thereof, in which said operator is provided along its inner surface with an annular channel, and further comprising a pin connected with said component and extending radially outwardly therefrom into said channel, said driver being provided with an axially extending slot affording limited axial displacement of said component and pin relative thereto, said spindle having an axially extending slot passing said pin therethrough and affording movement thereof with said operator and driver between the operative and inoperative positions of the latter.

18. The holder of claim 17 and further comprising spring structure connected with said spindle and driver to bias the latter toward the operative position thereof.

19. The holder of claim 12 in which said cooperative components comprise meshing teeth respectively provided along the inner driver-facing surface of said tool implement and lower implement-facing surface of said driver.